United States Patent
Reddy et al.

(10) Patent No.: US 10,419,446 B2
(45) Date of Patent: Sep. 17, 2019

(54) END-TO-END POLICY MANAGEMENT FOR A CHAIN OF ADMINISTRATIVE DOMAINS

(71) Applicant: Cisco Technology, Inc., San Jose, CA (US)

(72) Inventors: K. Tirumaleswar Reddy, Karnataka (IN); Prashanth Patil, San Jose, CA (US); Carlos M. Pignataro, Cary, NC (US); Puneeth Rao Lokapalli, Karnataka (IN); Judith Ying Priest, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 56 days.

(21) Appl. No.: 15/644,982

(22) Filed: Jul. 10, 2017

(65) Prior Publication Data
US 2019/0014124 A1    Jan. 10, 2019

(51) Int. Cl.
*H04L 29/06* (2006.01)
*H04L 29/08* (2006.01)
*H04L 12/24* (2006.01)

(52) U.S. Cl.
CPC ............ *H04L 63/108* (2013.01); *H04L 41/00* (2013.01); *H04L 67/125* (2013.01); *H04L 63/164* (2013.01); *H04L 2209/20* (2013.01)

(58) Field of Classification Search
CPC . H04L 63/108; H04L 67/125; H04L 2209/20; H04L 63/164

(Continued)

(56) References Cited

U.S. PATENT DOCUMENTS 7,930,760 B2    4/2011  Coles et al.
9,608,829 B2    3/2017  Spanos et al.
(Continued)

FOREIGN PATENT DOCUMENTS

WO    WO-2018125989 A2 *  7/2018    ........... H04L 67/104
WO    WO 2018126029 A3 *  7/2018    ............. H04L 29/08
WO    WO 2018126075 A1 *  7/2018    ............. H04L 29/12

OTHER PUBLICATIONS

P. Quinn, Ed., et al., "Network Service Header" draft-ietf-sfc-nsh-12.txt, Internet-Draft, Feb. 23, 2017, 37 pages.
(Continued)

*Primary Examiner* — David R Lazaro
*Assistant Examiner* — Berhanu Shitayewoldetadik
(74) *Attorney, Agent, or Firm* — Edell, Shapiro & Finnan, LLC

(57) ABSTRACT

Managing policies for a chain of administrative domains, from end-to-end, includes receiving, at a network device associated with an administrative domain that is part of a chain of administrative domains provisioning an Internet-based application or an Internet-based service to a network, a root block for a blockchain. The root block is generated by a network device in the network and includes a request for a specific network parameter over a specific time period. The network device associated with the administrative domain appends a first block to the blockchain including the root block to accept the request and configures the administrative domain in accordance with the specific network parameter when an end-to-end path in the chain of administrative domains accepts the request. The network device associated with the administrative domain also generates blockchain transactions that append network status updates to the blockchain during the specific time period.

20 Claims, 5 Drawing Sheets

(58) Field of Classification Search
USPC .......................................................... 709/226
See application file for complete search history.

(56) References Cited

U.S. PATENT DOCUMENTS

| | | | | |
|---|---|---|---|---|
| 2008/0301298 | A1* | 12/2008 | Bernardi | H04L 29/12207 709/226 |
| 2012/0143643 | A1* | 6/2012 | Gil | G06Q 10/06 705/7.12 |
| 2014/0283010 | A1* | 9/2014 | Rutkowski | G06F 21/31 726/18 |
| 2015/0106624 | A1* | 4/2015 | Gero | H04L 9/0643 713/171 |
| 2016/0028552 | A1* | 1/2016 | Spanos | H04L 9/3297 713/178 |
| 2016/0248682 | A1 | 8/2016 | Lee et al. | |
| 2016/0261685 | A1* | 9/2016 | Chen | H04L 67/104 |
| 2016/0275461 | A1* | 9/2016 | Sprague | G06Q 20/0655 |
| 2017/0046669 | A1* | 2/2017 | Chow | G06Q 10/0631 |
| 2017/0064039 | A1 | 3/2017 | Shen et al. | |
| 2017/0076306 | A1* | 3/2017 | Snider | G06Q 30/0205 |
| 2017/0103468 | A1* | 4/2017 | Orsini | G06Q 40/12 |
| 2017/0118301 | A1* | 4/2017 | Kouru | H04L 67/2842 |
| 2017/0238072 | A1* | 8/2017 | Mackie | G01F 1/60 340/870.03 |
| 2017/0324738 | A1* | 11/2017 | Hari | H04L 61/2061 |
| 2017/0346830 | A1* | 11/2017 | Goldfarb | H04L 67/20 |
| 2017/0366547 | A1* | 12/2017 | Goldfarb | H04L 63/08 |
| 2018/0248701 | A1* | 8/2018 | Johnson | H04L 9/3247 |

OTHER PUBLICATIONS

"Hyperledger Burrow (formerly eris-db)", Mar. 28, 2017, available at https://www.hyperledger.org/project, 9 pages.

D. Gassen, et al., "BGP Flow Specification Deployment Experience", NANOG38, Oct. 8-10, 2006, St. Louis, MO, 28 pages.

"Implementing BGP Flowspec", OL-32692-01, Cisco ASR 9000 Series Aggregation Services Router Routing Configuration Guide, Release 5.2.x, 26 pages.

T. Reddy, et al., "Distributed Denial-of-Service Open Threat Signaling (DOTS) Data Channel", draft-reddy-dots-data-channel-04, DOTS, Internet-Draft, Feb. 15, 2017, 21 pages.

* cited by examiner

END-TO-END POLICY MANAGEMENT FOR A CHAIN OF ADMINISTRATIVE DOMAINS

TECHNICAL FIELD

The present disclosure relates to network services and network security.

BACKGROUND

Internet-based applications and services are often provided to a network by a chain of administrative domains. For example, administrative domains of service providers in a chain of service provider (referred to herein as a "SP chain") may convey packets for a given Internet Protocol (IP) service or application. Network parameters of the connectivity provided by the SP chain (or any chain of administrative domains), such as bandwidth, may be limited by any of the administrative domains in the chain (i.e., the maximum bandwidth provided by an SP chain may be the lowest maximum bandwidth provided by the administrative domain of any service provider in the SP chain). Moreover, often, a chain of administrative domains provides static network parameters (i.e., a fixed maximum bandwidth) and the various administrative domains forming the chain are unable to communicate to coordinate any changes. Consequently, a network (i.e., a home network or enterprise network) can often only obtain upgraded network parameters (i.e., increased upload speed) by altering a monthly or yearly subscription.

Due to at least the aforementioned issues, obtaining connectivity for an IP application or service with suitable network parameters is often expensive and inefficient, especially for networks with shifting and dynamic needs (i.e., networks that intermittently or infrequently need increased upload speed, bandwidth, etc. for a particular service or application). The aforementioned issues may also limit the ability of a chain of administrative domains to identify and defend against network threats/attacks, such as a distributed denial of service (DDoS) attack.

DESCRIPTION OF EXAMPLE EMBODIMENTS

Overview

Figure 1:
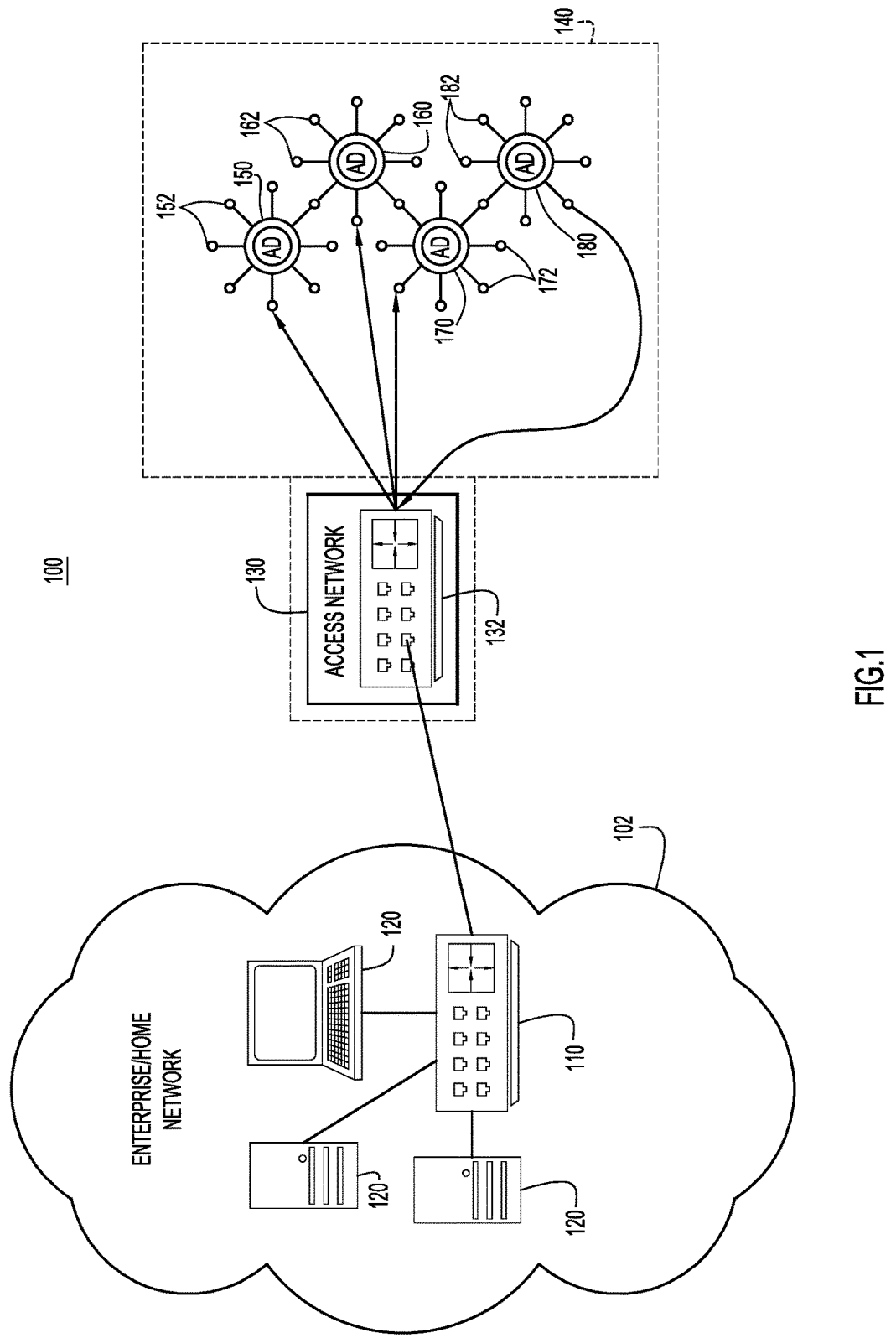
FIG. 1 is a diagram illustrating a networking environment in which policy management techniques presented herein may be employed, according to an example embodiment.

Techniques are presented herein for managing policies for a chain of administrative domains, from end-to-end. These techniques may be embodied as one or more methods, one or more devices, a system, and instructions in a computer-readable storage media to perform the method.

According to at least one example embodiment, managing policies for a chain of administrative domains, from end-to-end, includes receiving, at a network device associated with an administrative domain that is part of a chain of administrative domains provisioning an Internet-based application or an Internet-based service to a network, a root block for a blockchain. The root block is generated by a network device in the network and includes a request for a specific network parameter over a specific time period. The network device associated with the administrative domain appends a first block to the blockchain including the root block to accept the request. The network device configures the administrative domain in accordance with the specific network parameter when an end-to-end path in the chain of administrative domains accepts the request so that the Internet-based application or the Internet-based service is provisioned to the network with the specific network parameter across the end-to-end path. The network device also generates blockchain transactions that append network status updates to the blockchain during the specific time period.

Example Embodiments

Presented herein are techniques for managing and enforcing policies for a chain of administrative domains, from end-to-end along a chain of administrative domains. More specifically, the techniques presented herein utilize blockchained transactions to share network policies across administrative domains that are conveying packets for a given Internet Protocol (IP) service or application. The blockchained transactions manage policies in a distributed or decentralized manner and allow administrative domains in a chain of administrative domains to communicate with each other (and a home or enterprise network) to dynamically alter network policies. Consequently, the techniques presented herein allow administrative domains to provision an Internet-based application or an Internet-based service to a home or enterprise network with dynamic network parameters. As a specific example, a chain of service providers (a "SP chain") can alter network parameters for an IP application in response to a request from a network and guarantee that any requested network parameters are satisfied (i.e., provided or provisioned) for a requested period of time.

Said another way, the techniques presented herein provide an implementation of blockchain-as-a-service (BaaS) that manages and enforces network parameters of connectivity (i.e., bandwidth, upload speed, filtering rules, etc.) for an IP service or application in a secure, but flexible, ledger. The BaaS implementation is tightly integrated into network devices (i.e., router, switch or other such blockchain infrastructure) associated with a chain of administrative domains to form a blockchain network. The administrative domains in the blockchain network can quickly and securely communicate via blockchained transactions. Consequently, the administrative domains in a chain of administrative domains can dynamically change, provide, monitor, etc., network parameters of connectivity for an IP service or application (i.e., to satisfy a policy request from an enterprise network). The blockchained transactions may utilize any template or format so that the blockchain structures can be adjusted to track a multitude of network parameters with any degree of granularity. However, as is explained in further detail below, the techniques presented herein utilize preexisting relationships, validations, and/or authorizations within a chain of administrative domains and/or between an enterprise or home network and its access network to expedite consensus for blockchained transactions. Consequently, the techniques provided herein allow a chain of administrative domains to quickly adjust network parameters.

Among other advantages, the secure ledger created by the BaaS presented herein allows a chain of administrative domains to quickly and dynamically respond to requests for one or more specific network parameters. This dynamic responsiveness may allow customers to dynamically adjust (and pay for) specific network parameters for an IP service or application. For example, when the techniques presented herein are implemented for a specific customer (i.e., a particular enterprise), the customer can pay for only the network parameters that they need to use (i.e., pre-pay, but with dynamic terms) or only the network parameters they have already used (i.e., post-pay based on consumption). Thus, if the specific customer infrequently needs a higher upload speed (i.e., to export large amounts of data to the cloud for big data analytics), the customer can request higher upload speeds on-demand and only pay for higher upload speeds based on usage (as opposed to upgrading the upload speed, at a significant cost, on a monthly or yearly basis). Consequently, the techniques presented herein are well-suited for dynamic and quickly evolving network environments utilizing a wide variety of Internet-based applications and services, each of which may have different Internet connectivity demands. More generally, the techniques provided herein provide new and efficient techniques for delivering Internet-based applications and services to customers with varying network parameters.

Referring first to FIG. 1, a description is provided of a network environment 100 in which the techniques presented herein may be employed, according to at least one example embodiment. The network environment 100 includes an enterprise or home network 102 that is formed by one or more network devices 110 (i.e., routers and/or switches, an example of which is described in further detail below in connection with FIG. 5) and one or more computing devices 120 (i.e., servers and personal computing devices). The one or more network devices 110 provide Internet connectivity for the computing devices 120 through one or more network devices 132 of an access network 130. The access network 130 connects the network 102 to a chain 140 that includes a plurality of administrative domains (each of which is labeled with "AD" in FIG. 1). However, in other embodiments, the access network 130 is part of the chain 140. Consequently, in the depicted embodiment, access network 130 is shown within a dashed box that is connected to the dashed box delineating the chain 140.

If, in the illustrated embodiment, the access network 130 is separate from the chain 140, the chain 140 includes four administrative domains that are each provisioned by a plurality of network devices: a first administrative domain 150 with a plurality of network devices 152; a second administrative domain 160 with a plurality of network devices 162; a third administrative domain 170 with a plurality of network devices 172; and a fourth administrative domain 180 with a plurality of network devices 182. Collectively, administrative domains 150, 160, 170, and 180 form a single end-to-end path from the access network 130 to a final administrative domain (here, administrative domain 180); however, in other embodiments, the chain 140 may include a plurality of end-to-end paths (i.e., chain 140 may have different paths from access network 130 to administrative domain 180). In fact, chain 140 is merely an example and, in other embodiments, a chain of administrative domain may include any number of administrative domains (i.e., administrative domains associated with service providers) with any number of network devices. As one example, access network 130 may be or include a fifth administrative domain in the chain 140 (albeit the first administrative domain from the perspective of network 102). Moreover, the chain 140 may be associated with or provide one or more paths across any entities. As one example, the chain 140 may be a chain of administrative domains associated with various service providers (i.e., chain 140 may be a SP chain).

Generally, the one or more network devices 110 of network 102, the one or more network devices 132 of access network 130, and the one or more network devices 152, 162, 172, and 182 of each administrative domain 150, 160, 170, and 180 form a blockchain network configured to perform operations associated with the BaaS implementation presented herein. That is, the aforementioned network devices are configured to create an indestructible ledger of time-stamped transactions in a distributed manner. The network devices leverage their natural displacement in a similar manner to traditional blockchain implementations; however, the network devices do not form a consensus in a traditional manner. Instead, the present techniques utilize preexisting agreements (and the underlying authorizations and/or validations) to form a "consensus" in an expedited manner.

More specifically, in a traditional BaaS implementation, consensus is often required between 51% or more of network nodes. By comparison, with the techniques presented herein, the access network 130 validates blocks generated by the network 102 and administrative domains in chain 140 validate blocks generated by other administrative domains in chain 140. In particular, since the access network 130 is an Internet service provider (ISP) that has an agreement with the enterprise/home network 102 (also referred to herein as network 102), network 102 has a certificate (or some other type of validating or authorizing information, such as a key or token) from the access network 130. Consequently, the network 102 can generate a root (genesis) element with the certificate (i.e., the certificate is used to sign a root block). The access network 130 can then authenticate the root block based on the certificate and commit the root block to a blockchain. This authenticating is one form of "consensus" utilized by the techniques presented herein and may be significantly faster than conventional techniques that require consensus from a majority of network nodes.

As is explained below in connection with FIGS. 2-4, once the blockchain root element is authenticated by the access network 130, a network device 132 in the access network 130 can broadcast the blockchain root element (the root block) to any administrative domain in chain 140 (i.e., administrative domains 150, 160, 170, and 180). Then, the administrative domains in chain 140 can publish blocks to the blockchain (i.e., add transactions to the blockchain) and neighboring administrative domains can validate the published blocks after reaching a "consensus" based on pre-existing relationships.

More specifically, a block published by an administrative domain in the chain 140 is validated by the neighboring administrative domains with whom the publishing administrative domain has direct contact. In one example, Practical Byzantine Fault Tolerance is used to obtain consensus amongst neighbors. The neighboring administrative domains may be able to validate blocks because neighboring administrative domains can share certificates or other such authorization information to validate/authorize each other when the chain 140 is formed. As an example, a block published by administrative domain 160 can be validated by administrative domain 150 or administrative domain 170. As is explained in further detail below, this allows the administrative domains 150, 160, 170, and 180 in chain 140 to quickly, efficiently, and securely communicate to coordinate network policies from end-to-end, track enforcement of policies, and otherwise provide dynamic management of network policies. That is, a chain of administrative domains can dynamically manage policies from end-to-end of the chain due, at least in part, to the aforementioned techniques for forming a rapid, and in many cases immediate, consensus.

As is explained in further detail below, the blockchain created by the network devices 110 of the network and the network devices 152, 162, 172, and 182 of each administrative domain 150, 160, 170, and 180 may allow a computing device 120 in network 102 to request specific network parameters for specific time periods. Then, the network 102 can, via network device 110, monitor the enforcement of the requested network parameters by monitoring the blockchain. Similarly, administrative domains 150, 160, 170, and 180, as well as access network 130, can monitor the blockchain (i.e., via their respective network devices 152, 162, 172, 182, and 132). A "smart contract" embedded in a blockchain may also monitor the blockchain to ensure the network 102 is properly billed for provisioned network parameters, insofar as a "smart contract" includes any type of codified business logic configured to execute the operations executed described herein as executed by a smart contract. The blockchain may also be distributed to any entities that might benefit from a secure ledger of policy enforcement.

Figure 2:
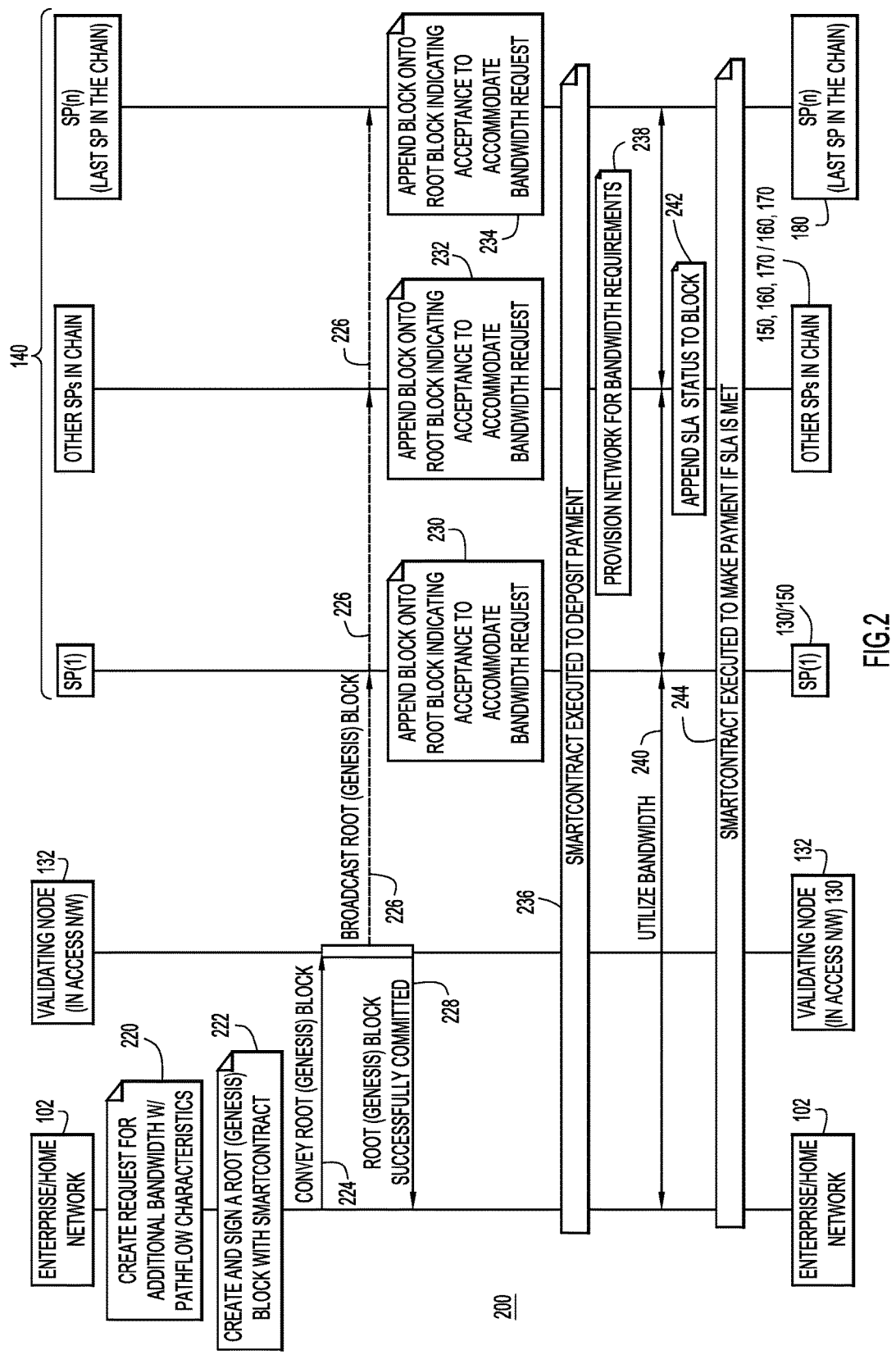
FIG. 2 is a sequence diagram depicting interactions between an enterprise/home network, an access network, and a chain of administrative domains, according to an example embodiment of the techniques presented herein.

Referring next to FIG. 2 for a description of a sequence diagram of a process 200 involving operations performed in accordance with the techniques presented herein. In FIG. 2, the operations depict a specific example involving administrative domains of service providers. However, this example is not intended to be limiting and the techniques presented herein may be deployment agnostic (i.e., suitable for deployment across any administrative domains, such as across administrative domains of enterprises, data centers and other non-service provider entities). Thus, although operations 200 are described with reference to administrative domains of service providers, it is to be understood that this is merely an example and the description may apply to any cross-administrative domain deployment.

At the same time, reference is also made to FIG. 1 for the purposes of the description of FIG. 2. Thus, operations 200 depict interactions between enterprise/home network 102, a network device 132 serving as a validating node in the access network 130, and administrative domains 150, 160, 170, 180; however, now, as part of the example, administrative domains 150, 160, 170, 180 are described as administrative domains of service providers in a SP chain 140. As is described above with respect to chain 140, the SP chain 140 may include administrative domains from any number of service providers. Thus, in FIG. 2, the administrative domain of the first service provider in SP chain 140 is labeled as "SP(1)," the administrative domain of the last service provider in SP chain 140 is labeled as "SP(n)," and any administrative domain of the service providers therebetween are labeled as "Other SPs in the chain." Moreover, since, in some instances, the access network 130 may be a part of the SP chain 140 (i.e., access network 130 may have or provide an administrative domain that is part of the SP chain 140), "SP(1)" is labeled as the administrative domain of access network 130 or service provider 150 and "Other SPs in the chain" are labeled as the administrative domains of service providers 150, 160, 170 or the administrative domains of service providers 160, 170 (the former label indicating that an administrative domain of access network 130 is part of the SP chain 140).

Now turning to the process 200 performed by the aforementioned entities, generally, the process 200 is an example embodiment where the network 102 needs additional bandwidth with specific path/flow characteristics for a particular IP application or service (i.e., upstream and downstream delay tolerance, loss tolerance, jitter tolerance, minimum bandwidth and maximum bandwidth in the request, etc.). However, bandwidth and path/flow characteristics are merely examples of network parameters, and in other embodiments, the network 102 may request any desired network parameter or policy (a policy may include or imply certain network parameters).

In the depicted embodiment, at 220, the enterprise or home network 102 creates a request for the SP chain 140 to provide a flow or set of flows with additional bandwidth and specific path/flow characteristics for a specific time period. The network 102 may create this request for any reason (administrative domains associated with an SP chain often have limited bandwidth or other such characteristics that prevent some applications from functioning as well as desired), but as a specific example, a home network may make the request so that the home network can stream a three dimensional (3D) movie. However, the home network may need a high-speed Internet connection for infrequent 3D movies and not for normal (ongoing) operations. Consequently, it may be more cost efficient for the home network to regularly utilize a slower, but cheaper Internet connection for their video streaming application and intermittently request increased bandwidth for specific periods of time.

As another, non-bandwidth example, an enterprise network may want to intermittently request increased network parameters for large data exports. When exporting data to the cloud, the enterprise network may need to export a few hundred gigabytes or even a terabyte (or more) of data and, thus, the export operations may be constrained by the limited upload speed provided by the SP chain. However, if these exports only occur infrequently, it may be more cost efficient for the enterprise network to regularly utilize a slower, but cheaper Internet connection for an export service and intermittently request increased network parameters.

Regardless of why the request is created, at 222, the enterprise network 102 (or more specifically, one of the one or more network devices 110 included in enterprise network 102) generates a root (genesis) block with the request. The network 102 signs the root block with a certificate or other such authorization information that the network 102 has from a preexisting agreement with the access network 130. The request included in the root block specifies network parameters that the network 102 wants or needs the SP chain 140 to provision to the network 102 and a specific time period for which the network parameters are needed/wanted. In other words, the request includes terms (i.e., contract terms) that are to be satisfied to satisfy the request. The terms may also specify the payment (or other consideration) that will be provided to the service providers if the service providers satisfy the terms of the request, as well as the method with which the payment will be provided (i.e., pre-pay, pay-as-you-go, and/or a smart contract).

In at least some embodiments, the terms are included in a smart contract that is embedded with the root block. As is explained in further detail below, the smart contract (or, more specifically, code included in the smart contract) may execute automatically when the terms are satisfied over the specified time period (i.e., when the requested network parameters are enforced over the specified time period). The time period may be a specific length of time (i.e., one day) or a dynamic time period tied to task (i.e., during operations of a specific application). When the time period is a dynamic time period, the time period may provide some forgiveness for interruptions, so that the network parameters are provided over the course of a certain activity or task, regardless of whether connectivity is temporarily lost, the task is paused, or some other interruption causes the task to be completed in chunks or portions. For example, the time period may be tied to the length of a 3D movie or the amount of data selected for export.

At 224, the enterprise or home network 102 conveys the root (or genesis) block to a validating node in the access network 130. More specifically, a network device 110 in network 102 conveys the root block to a network device 132 in the access network 130 that is serving as a validating node. The request created at 220 will be included in the root block as a transaction.

At 226, the network device 132 in the access network 130 that is serving as a validating node broadcasts the root block to any service providers participating in the SP chain 140. Meanwhile, at 228, the root block is successfully committed to a blockchain. For example, in at least some instances, a new blockchain is created or originated based on the root block.

Then, at 230, 232, and 234, the service providers in SP chain 140 can accept the terms of the request (i.e., the terms of a smart contract embedded in the root block). More specifically, at 230, a network device associated with SP(1) (i.e., network device 132 for access network 130 or network device 152 for service provider 150) may append a block to the blockchain including the root block that indicates that SP(1) can and will accept the terms of the request included in the root block. Similarly, at 232, network devices associated with the other SPs in SP chain 140 (i.e., network devices 152, 162, and 172 or network devices 162 and 172) may append a block to the blockchain including the root block that indicates that the other SPs in SP chain 140 can and will accept the terms of the request included in the root block. Finally, at 234, a network device associated with SP(n) (i.e., one of network devices 182) may append a block to the blockchain including the root block that indicates that the last service provider (SP(n)) in SP chain 140 can and will accept the terms of the request included in the root block. In the specific embodiment depicted in FIG. 2, at 230, 232, 234, each service provider in SP chain 140 is indicating whether they can and will provide the additional bandwidth and the specific path/flow characteristics requested at 220 to network 102 for a specific time period included in the request.

If an end-to-end path in the SP chain 140 (i.e., service providers 150, 160, 170, and 180) accepts the terms of a request, the network 102 will know (due to the transactions in the blockchain) that its request will be satisfied and will deposit a payment (as specified in the terms in the request) into an escrow account or some other holding space at 236. Alternatively, the smart contract may monitor the blockchain and request a payment when an end-to-end path in SP chain 140 accepts the terms of the request. For example, if all of the service providers in SP chain 140 agree to provide a specific bandwidth for a specific time period, code of the smart contract may execute to request that the network 102 deposit a payment into the smart contract at 236. Alternatively, the smart contract may automatically withdraw the payment from the network 102. However, in other embodiments, the techniques may utilize other payment methods. For example, the service providers may monitor usage and bill the network with a pre-pay or post pay model. Regardless of the payment method, the payment can be made with any currency or cryptocurrency and the payment will eventually pay the service providers in the SP chain 140 (as is explained below).

Additionally, if an end-to-end path in the SP chain 140 (i.e., service providers 150, 160, 170, and 180) accepts the terms of a request, the service providers in the SP chain 140 provision their administrative domains for the requested network parameters at 238. That is, the service providers in SP chain 140 enforce the requested policy and/or network parameters. To enforce the policy or network parameters, the network devices of each service provider in the SP chain 140 may analyze their settings and determine if any settings must be changed. If any changes are required, the settings may be reconfigured to adequately satisfy the requested network parameters. Alternatively, a network device can be configured to enforce requested network parameters regardless of its current settings (i.e., once all of the service providers in SP chain 140 agree to the terms of a request, each network device may configure itself to enforce requested network parameters). The network devices may reconfigure themselves or be reconfigured by another entity (or a user). As one specific example, a software-defined networking (SDN) controller may program on-path network devices to enforce the requested network parameters. If a policy is requested (i.e., a QoS policy with integrated or differentiated services (IntServ or DiffServ)), the network devices may also parse the policy to determine any network parameters to be enforced.

In some instances, the operations performed at 238 are performed in response to a payment being deposited at step 234; however, in other instances, the operations at 238 are performed in response to all of the service providers in SP chain 140 agreeing to the terms of the request. Either way, the BaaS implementation presented herein ensures that the network 102 and the service providers in SP chain 140 all know when an end-to-end path in SP chain 140 agrees to the terms of a request. Moreover, in some instances, the last service provider in the SP chain to agree to the request (not necessarily the last service provider in the SP chain (i.e., not SP(n)) sends a signed notification to every participant in the blockchain, ensuring that every participant knows the SP chain has fully agreed to enforce the requested network parameters.

If, instead, some of the service providers can or will satisfy the terms of the request (i.e., only three of four service providers in a SP chain can provide a requested bandwidth), the SP chain 140 partially agrees to satisfy the request. When a portion of the SP chain 140 agrees to satisfy the requested terms (i.e., the smart contract is accepted by a subset of service providers forming the SP chain 140, such that the smart contract is not fully executed), the network 102 may be able to alter the terms of the request (resulting in a new request being issued) or cancel the request. For example, if the network 102 requests an increase of x Mbps of upstream bandwidth at a specific time and the SP chain 140 can provide an increase, but of an amount less than x or not at the specific time, the network 102 may be able to alter the offered payment or cancel the request. Alternatively, the network 102 can accept the partial agreement. For example, if the request specifies a filtering rule (i.e., an access control list (ACL)) and offers a payment on a per-service-provider-basis, the network 102 may still want the request enforced at as many of the service providers as possible and, thus, a partial agreement may be acceptable. As yet another alternative, if a smart contract is only partially accepted, the smart contract (and the request) may automatically void.

At 240, the network 102, or a device operating therein (i.e., computing device 120), utilizes an application or service with the requested network parameter(s). In the depicted embodiment, network 102 utilizes an application with additional bandwidth (i.e., a computing device 120 in network 102 utilizes a video streaming application with increased bandwidth in order to stream 3D video). The network 102 receives the requested network parameter for an amount of time specified in the request (i.e., the length of the 3D video program).

As the network 102 utilizes applications or services with the requested network features (i.e., during a time period in which the SP chain is providing the requested network parameters) at 240, the network parameters provided by the service providers are tracked with blockchain transactions that are appended, at 242, to the blockchain including the root block. More specifically, at 242, service providers in the SP chain 140 append new blocks to the blockchain with network status updates. The network status updates track the network performance via one or more metrics related to the requested network parameter. In some implementations, every service provider appends the same type of metric to the blockchain with the root block (which may, in some instances, be a sidechain running parallel to a blockchain used to provision the IP application or service) to track a particular network parameter. However, the metric (or the values of the metric) may vary in different implementations (or over time) based on the network parameter that is being tracked with the updates (i.e., the network parameter requested at 222).

At 242, the administrative domains append new blocks to the blockchain at predetermined time intervals or at dynamically determined time intervals. For example, in the embodiment depicted in FIG. 2, each service provider can append blocks to the blockchain at dynamic intervals that are dependent on the size of chunks of data delivered to the network (i.e., each service provider can add a block after four chunks of data are delivered to the network 102 and since chunks may vary in size, the service providers can append blocks at varying time intervals.).

To be clear, the transactions appended to the blockchain at 242 are appended to the blockchain to which the initial request is committed at 228. If the application or service of interest (i.e., the application or service being monitored) utilizes a blockchain (i.e., if the application is a blockchain application), the network performance updates may be recorded in a sidechain in order to keep the network status updates separate from any application or service data. Alternatively, if desired, the initial request and subsequent transactions (from 228 and 242) may be committed to an application blockchain. Either way, each administrative domain in an end-to-end path adds transactions to the blockchain so that the blockchain includes network parameters from every administrative domain in an end-to-end path. Consequently, the blockchain may provide a secure ledger of provisioned network parameters and allow the cause of any discrepancies to be easily identified. For example, if an administrative domain is not providing agreed upon network parameters (even if an SDN controller believes it is providing the requested network parameters), the secure ledger of the blockchain may identify the administrative domain as the cause of the discrepancy. That is, the life of a packet can be tracked over a particular path as it flows through the path or subsequent to traveling the path.

Generally, the network status updates allow the smart contract and/or the network 102 (as well as each administrative domain) to determine if the network is being provided with the specific network parameter from end-to-end across the SP chain 140. In other words, the blocks added at 242 enable service level agreement (SLA) monitoring. When the terms of a request are accepted by SP chain 140, the SP chain 140 essentially agrees to a SLA. Then, the blockchain created based on the root element including the initial request allows an entity (i.e., network 102, the smart contract, or a service provider) to ensure the SP chain 140 is complying with the SLA. Moreover, an entity providing an application or service can monitor SLA compliance. For example, application providers that have a tie-up with service providers can leverage the techniques presented herein to monitor pack flow across an SP chain for auditing. If the SP chain 140 complies with the SLA over the specific time period included in the request (included in the root block created at 222), the SP chain 140 satisfies the terms of the request. Consequently, at 244, smart contract code is executed to complete the payment from the network 102 to the service providers in SP chain 140. That is, the payment deposited by the network at step 236 (into escrow) is transferred to the service providers in SP chain 140 at 244.

Overall, process 200 is particularly useful because it allows dynamic alterations of network parameters. Typically, there is no way for administrative domains in a chain of administrative domains to communicate and provide coordinated flexibility. Moreover, even if the administrative domains can alter network parameters, a lack of communication within the chain usually prevents the administrative domains from guaranteeing a network parameter over a specific time period. From a customer perspective (i.e., the perspective of network 102), the process 200 provides efficient and cost effective manners of obtaining enhanced network parameters on-demand. The smart contracts also allow enhanced network parameters to be obtained automatically, without a complicated billing or accounting system that burdens the service providers and hassles the customers. Moreover, in at least some instances, the techniques presented herein can be easily scaled so that multiple networks can partake in the same end-to-end request.

Figure 3:
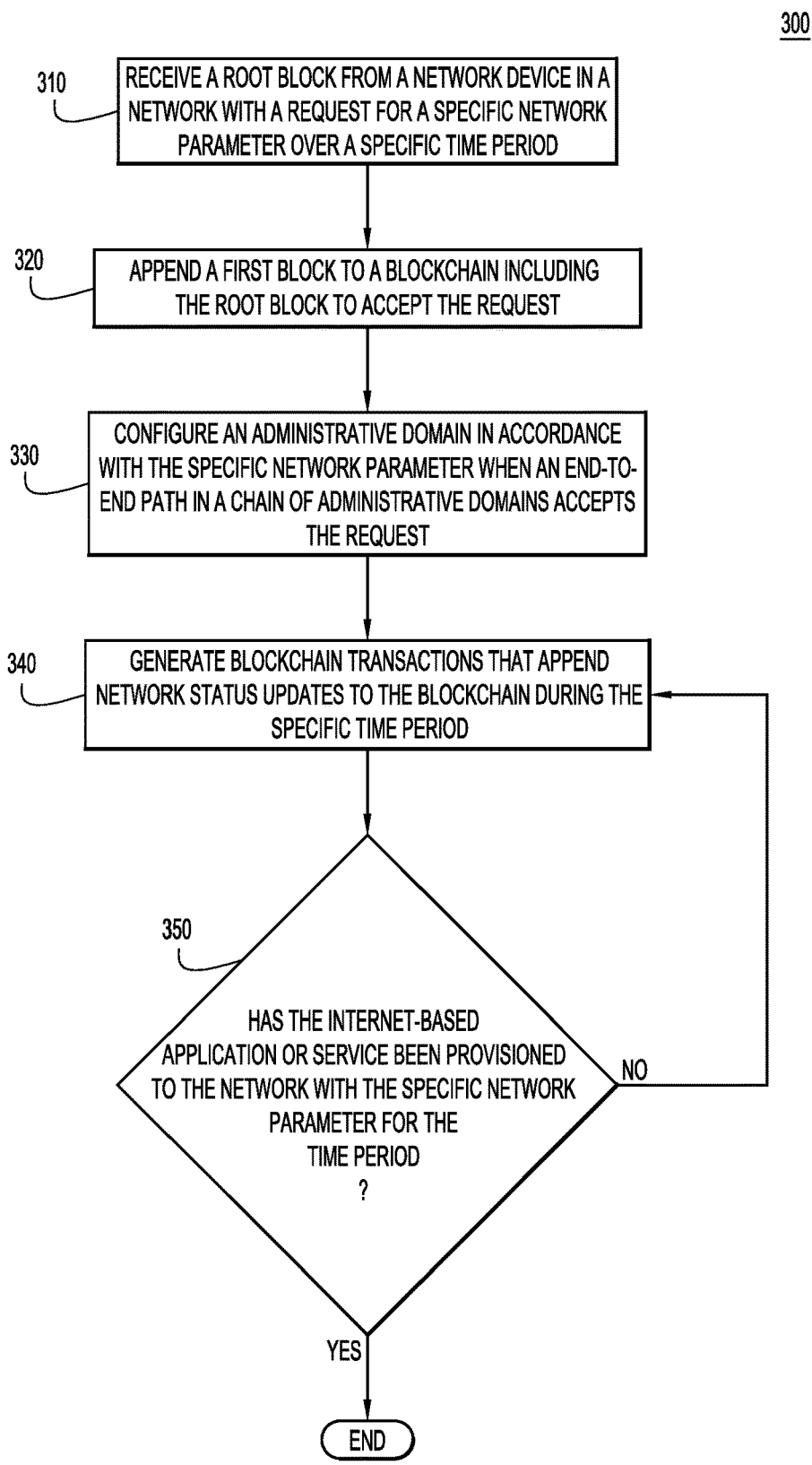
FIG. 3 is a high-level flowchart illustrating a method for managing policies for a chain of administrative domains, from end-to-end, from the perspective of a network device associated with one of the administrative domains in the chain, according to an example embodiment of the techniques presented herein.

Referring next to FIG. 3 for a description of a high-level flow chart of a method 300 depicting operations performed by a network device associated with an administrative domain that is part of a chain of administrative domains provisioning an Internet-based application or an Internet-based service to a network. Reference is also made to FIGS. 1 and 2 for the purposes of the description of FIG. 3 and, thus, at least some operations or steps of method 300 are described with reference to administrative domains of service providers. However, again, it is to be understood that this is merely example and the description of method 300 may apply to a deployment across any administrative domains.

Initially, at 310, the network device receives a root block for a blockchain. As is discussed above (i.e., in connection with 220, 222, and 224), the root block is generated by a network device in the network being provisioned with the Internet-based application or an Internet-based service and the root block includes a request for a specific network parameter over a specific time period. In the example embodiment depicted in FIG. 2, the parameter is bandwidth; however, bandwidth is merely an example, and the network parameter may relate to any aspect of provisioning an Internet-based application or an Internet-based service to a network. The parameter may be directly related to the provisioning (i.e., bandwidth, latency, jitter, other quality of service (QoS) parameters, etc.) and/or indirectly related, such as security or filtering rules. As a specific example, the network parameter can be a filtering rule, such as an access control list (ACL). As is explained in further detail below, leveraging the techniques herein to manage filtering rules across a chain of administrative domains (i.e., a SP chain) may apply filtering rules (i.e., ACL rules) closer to the source of an attack, such as a distributed denial of service (DDoS) attack.

At 320, the network device accepts the request by appending a block to the blockchain including the root block. As mentioned above in connection with the description of operations/interactions 230, 232, and 234 of FIG. 2, in some instances, a smart contract is embedded within the root block. In these instances, the appending may include accepting an offer included in the smart contract. However, by design, the smart contract does not execute code to complete the smart contract when the offer is accepted. Instead, code in the smart contract is executed to complete the smart contract when the specific network parameter is determined to be satisfied over the time period specified in the request (included in the root block). The smart contract (or the network) can make this determination based on network status updates that are appended to a blockchain including the root block.

Once an end-to-end path in the chain of administrative domains accepts the request (or alternatively, a network device in the home/enterprise network accepts a counter offer created by a partial acceptance), the network device (i.e., a service provider network device) configures its associated administrative domain in accordance with the specific network parameter at 330. For example, in the example embodiment of FIG. 2, the specific network parameter is a bandwidth requirement, and the network device configures its associated administrative domain by reconfiguring a bandwidth maximum provided by the administrative domain to satisfy the requested bandwidth when provisioning the Internet-based application or the Internet-based service to the network. In some instances, the service provider network device is also configured (or reconfigured). For example, the service provider network device may configure (or reconfigure) itself (or settings programmed therein) or another entity may configure (or reconfigure) the service provider network device.

When the service provider network device configures its associated administrative domain in accordance with the specific network parameter, the administrative domain can contribute to an end-to-end path that provisions the Internet-based application or service with the specific network parameter. More specifically, once an end-to-end path of administrative domains accepts the request, a device associated with each of the administrative domains in the end-to-end path configures its associated administrative domain in accordance with the specific network parameter so that the chain of administrative domains can provision the Internet-based application or the Internet-based service with the specific network parameter across the end-to-end path.

At 340, the network device generates blockchain transactions that append network status updates to the blockchain during the specific time period. The network status updates may track enforcement of the specific network parameter over the specific time period. Additionally or alternatively, the network status updates may notify each administrative domain in the chain of administrative domains of information. That is, the network status updates may allow the administrative domains to communicate with each other. For example, if the specific network parameter is a filtering rule, the network status updates may share any filtering rules being applied by the network device with other network devices associated with other administrative domains in the chain. For example, an administrative domain can add a block to the blockchain to notify all the participants in the blockchain network that the administrative domain is enforcing filtering rules conveyed in Border Gateway Protocol (BGP) flow specification (flowspec). Additionally or alternatively, an administrative domain can add a block to the blockchain to notify all the participants in the blockchain network that a DDoS attack matches one of its filtering rules. The block may include the DDoS attack details, such as attack type, total dropped packet count, average dropped packets per second, etc. In some instances, a combination of filtering rules and attack details may allow ACL rules to be applied closer to a source of attack and help to identify the source of a distributed denial of service (DDoS) attack. That is, distributing a filtering rule via BGP flowspec with the techniques presented herein may defend against DDoS attacks.

More specifically, a DDoS attack is an attempt to make machines or network resources unavailable to their intended users. In most cases, sufficient scale can be achieved by compromising enough end-hosts and using those infected hosts to perpetrate the attack. The victim in this attack can be an application server, a client or router, a firewall, a network link of an entire network, etc. However, a DDoS attack can be mitigated by blocking traffic from the attacker (s), for example BGP flowspec can be used to filter the attack traffic. The blockchain network presented herein allows any filtering rules that are developed to mitigate detected DDoS traffic (i.e., DDoS traffic detected with a DDoS detector in an Enterprise network) to be propagated upstream (or downstream) using BGP flowspec. Once the filtering rules are propagated through a chain of administrative domains, the blockchain network can monitor traffic and security statistics to collect information about the DDoS attack in a distributed manner. The techniques may also allow the home/enterprise network to determine which administrative domains are applying the filtering rules, which may provide an indication of whether an administrative domains is a victim of the attack.

That is, in embodiments where the techniques presented herein manage filtering rules across an SP chain, each administrative domain can publish blocks with security information (i.e., flow records, packet samples, etc.). Then, DDoS detection techniques can be used to analyze the published security information. Based on the published information, the target/victim network may learn which administrative domains in the blockchain network agreed to honor the filtering rules. Moreover, the security information may aggregate information collected from an attacker's IP address(es) conveyed in the BGP flowspec to identify a DDoS attack. Since each administrative domain publishes filtering related information to the blockchain, the administrative domains may communicate and share filtering rules. That is, the techniques presented herein allow for bi-directional and centralized gathering of threat information in a distributed manner. By comparison, conventional BGP flowspec techniques provide unidirectional notifications without any centralized information gathering or coordination between administrative domains. Thus, conventional BGP flowspec techniques are unable to share filtering rules in the same manner as the techniques presented herein. Moreover, conventional BGP flowspec techniques only work for BGP enabled nodes.

Still referring to FIG. 3, at 350, the network device determines whether the Internet-based application or service been provisioned to the network with the specific network parameter for the time period. If it has, the process can end. If not, the network device can continue to generate blockchain transactions at step 340. The frequency of this loop may vary because in some instances, the generated blockchain transactions are appended to the blockchain in additional blocks at predetermined or dynamically determined intervals within the specific time period, as discussed above in connection with operation 242.

Generally, method 300 can be performed relatively quickly at least due to the block validation techniques utilized by the network devices associated with the administrative domains. As is discussed at length in connection with FIGS. 1 and 2, in at least some instances, a network device associated with an administrative domain validates other blocks and other blockchain transactions published by other network device associated with other administrative domains in the chain of administrative domains based on authorization information shared between the administrative domains in establishing the chain of administrative domains.

Figure 4:
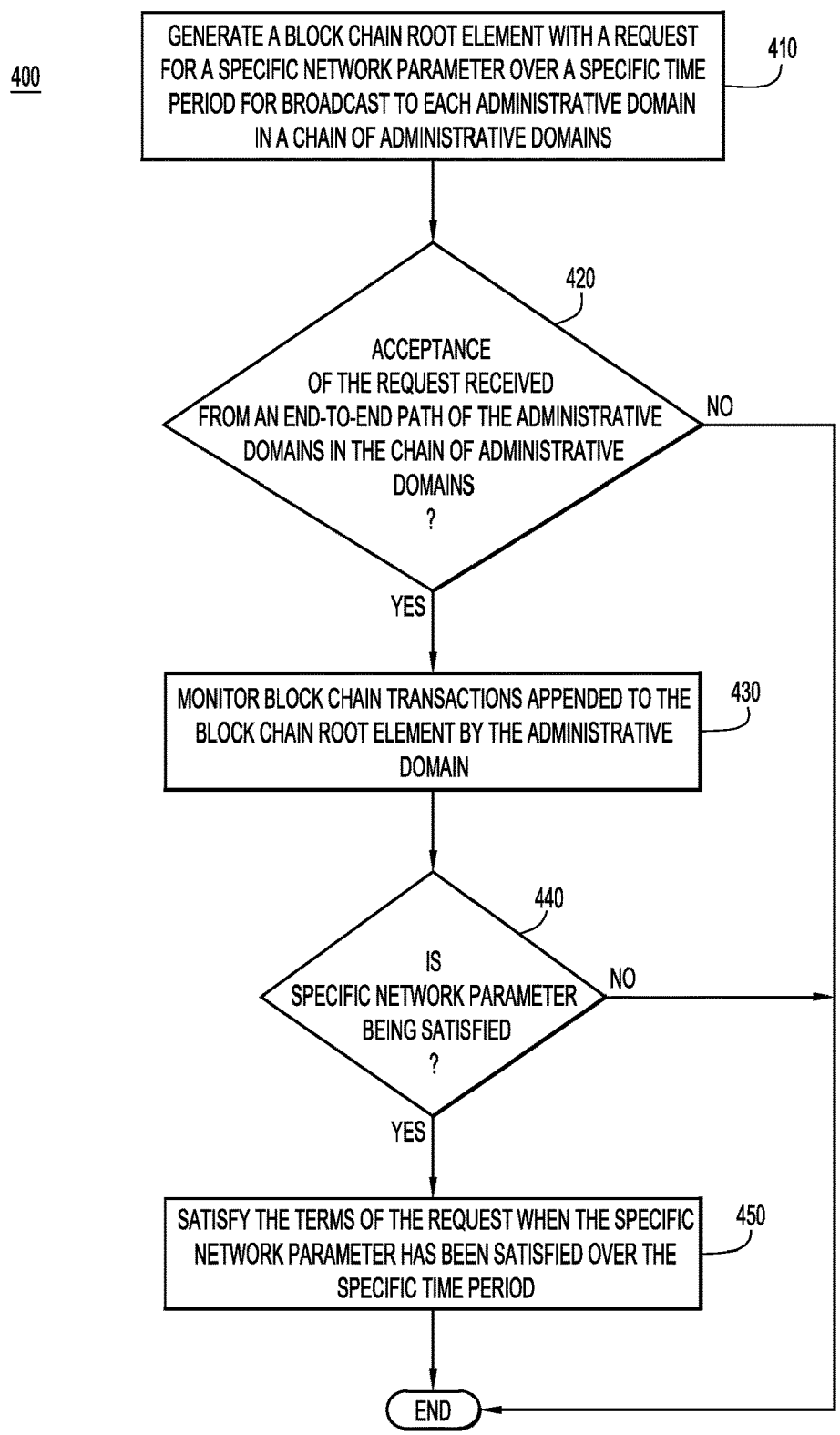
FIG. 4 is a high-level flowchart illustrating a method for requesting and monitoring policies across a chain of administrative domains in accordance with an example embodiment of the techniques presented herein.

Referring next to FIG. 4 for a description of a high-level flow chart of a method 400 depicting operations for requesting and monitoring policies across a chain of administrative domains in accordance with the techniques presented herein. These operations are performed, at least in part, by a smart contract embedded in a root block and/or a network device associated with a network that is provisioned with an Internet-based application or an Internet-based service by the SP chain. Additionally or alternatively, at least some of these operations may be performed by a network device associated with an administrative domain (i.e., a service provider network device), for example, to audit SLA compliance. Reference is also made to FIGS. 1 and 2 for the purposes of the description of FIG. 4 and, thus, at least some operations or steps of method 400 are described with reference to administrative domains of service providers. However, again, it is to be understood that this is merely example and the description of method 400 may apply to a deployment across any administrative domains.

Initially, at 410, the network device 110 in the network 102 generates a block chain root element with a request for a specific network parameter over a specific time period for broadcast to each of the administrative domains in the chain of service providers. As is discussed above, the access network 130 may broadcast this root block to a SP chain. At 420, the network element and/or the smart contract determines if the request has been accepted by an end-to-end path in the SP chain. If so, at 430, the smart contract and/or the network element monitors block chain transactions appended to the block chain root element by the service providers in the SP chain. For example, a network element in a home/enterprise network may measure or check requested network parameters to ensure they are being satisfied. Additionally or alternatively, a network device associated with an administrative domain and/or an application or service provider can monitor SLA compliance, for example, to resolve a conflict during an audit (regardless of the metric or parameter in question during the audit).

Based on the monitoring, the smart contact and/or the network element determines, at 440, whether the network parameter is being satisfied from end-to-end in the SP chain. That is, at 440, the smart contact and/or the network element ensures that the requested parameter is being provided. If the requested parameters are not being satisfied, the monitoring entity (i.e., a network device in network 102 or a network device from an administrative domain) may quickly identify the administrative domain causing the problem (based on the blockchain transactions appended to the blockchain with the root block). This may allow for specific/targeted corrective actions (i.e., path re-routing) and may also ensure that the network only pays for enhanced parameters when they are provided. Alternatively, an administrative domain may monitor the blockchain transactions to ensure compliance with agreed upon network parameters (i.e., for conflict resolution within the chain 140).

If the network parameters are satisfied for the length of the specific time period included in the request, the smart contact and/or the network element satisfies the terms of the request at 450. That is, the network pays for the enhanced network parameters, either manually or automatically via a smart contract. In the embodiment depicted in FIG. 4, the method 400 ends at 420 if anything less than a full acceptance is received from the SP chain and the method 400 ends at 440 if the network parameters are not being satisfied. However, as mentioned above, in other embodiments, the method 400 may have some tolerance or forgiveness to accommodate or handle a partial acceptance. Similarly, in some embodiments, the method 400 may have some tolerance or forgiveness to accommodate or handle a momentary or small lapse in satisfaction of the requested network parameters.

Figure 5:
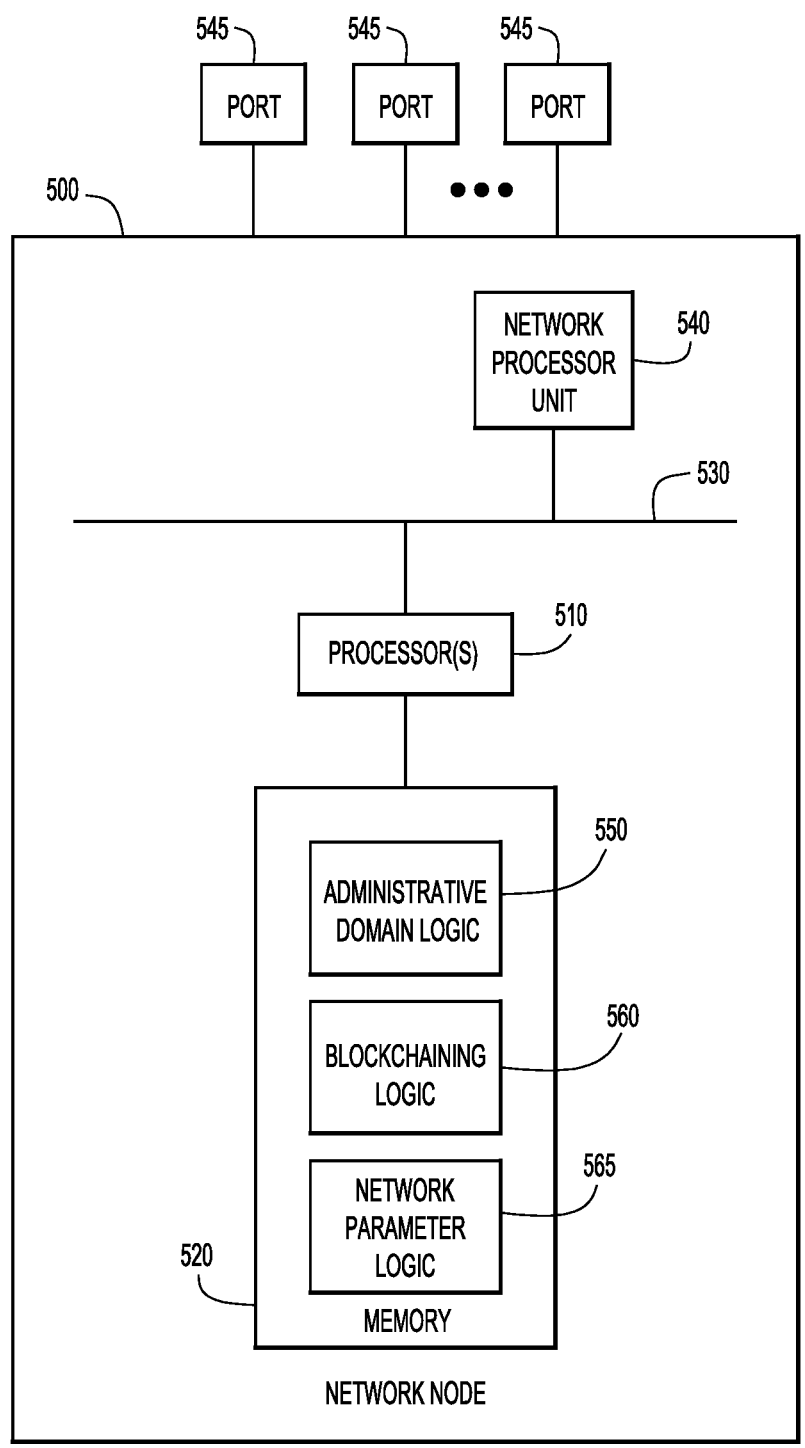
FIG. 5 is a block diagram of a network device configured to execute the techniques presented herein, according to an example embodiment.

Now referring to FIG. 5, an example block diagram is shown of a network device or network node 500 configured to execute the techniques presented herein. Network device 500 may be representative of any of the one or more network devices 110 of network 102, the one or more network devices 132 of access network 130, and the one or more network devices 152, 162, 172, and 182 of each administrative domain 150, 160, 170, and 180 shown in FIG. 1. The network device 500 includes one or more processors 510, memory 520, a bus 530 and a network processor unit 540. The processor 510 may be a microprocessor or microcontroller. The network processor unit 540 may include one or more Application Specific Integrated Circuits (ASICs) and facilitates network communications between the network device 500 and other network nodes as well as the server 130, and includes a plurality of network ports 545 from which to receive packets in a network and to which it routes packets into the network. The processor 510 executes instructions associated with software stored in memory 520.

Specifically, the memory 520 stores instructions for blockchaining logic 560 that, when executed by the processor 510, cause the network device to perform operations associated with creating a blockchained ledger to manage policies across administrative domains, including validation operations described herein. The memory 520 may also store network parameter logic 565 that, when executed by the processor 510, may cause the network device to track, record, monitor, etc. a specific network parameter being provisioned to a network. The network device may also include administrative domain logic 550 that may cause the network device to provision an Internet-based application or service to a network, according to the operations described herein. It should be noted that in some embodiments, the blockchaining logic 560, the network parameter logic 565 and/or the administrative domain logic 550 may be implemented in the form of firmware that is processed by ASICs, which may be integrated into a circuit board. Alternatively, the blockchaining logic 560, the network parameter logic 565 and/or the administrative domain logic 550 may be in the form of one or more logic blocks included in a programmable logic device (i.e., a field-programmable gate array).

More generally, the network device 500 performs a portion or all of the processing steps of the invention in response to the processor 510 executing one or more sequences of one or more instructions contained in memory 520. Such instructions may be read into the memory 520 from another computer readable medium, such as a removable media drive (not shown). One or more processors in a multi-processing arrangement may also be employed to execute the sequences of instructions contained in main memory 704. In alternative embodiments, hard-wired circuitry may be used in place of or in combination with software instructions. Thus, embodiments are not limited to any specific combination of hardware circuitry and software.

The memory 520 may include read only memory (ROM), random access memory (RAM), magnetic disk storage media devices, tamper-proof storage, optical storage media devices, flash memory devices, electrical, optical, or other physical/tangible memory storage devices. In general, the memory 520 may comprise one or more tangible (non-transitory) computer readable storage media (i.e., a memory device) encoded with software comprising computer executable instructions and when the software is executed (by the processor 510) it is operable to perform the operations described herein.

To summarize, in one form, a method is provided comprising: at a network device associated with an administrative domain that is part of a chain of administrative domains provisioning an Internet-based application or an Internet-based service to a network, receiving a root block for a blockchain, the root block being generated by a network device in the network and including a request for a specific network parameter over a specific time period; appending a first block to the blockchain including the root block to accept the request; configuring the administrative domain in accordance with the specific network parameter when an end-to-end path in the chain of administrative domains accepts the request, so that the Internet-based application or the Internet-based service is provisioned to the network with the specific network parameter across the end-to-end path; and generating blockchain transactions that append network status updates to the blockchain during the specific time period.

In another form, a system is provided comprising: a network including a plurality of network devices, wherein each of the plurality of network devices is configured to: generate a root block for a blockchain with a request for a specific network parameter over a specific time period; and a chain of administrative domains provisioning an Internet-based application or an Internet-based service to the network, wherein each of the administrative domains includes a network device configured to: receive the block chain root element; append a first block to the blockchain including the root block to accept the request; configure its associated administrative domain in accordance with the specific network parameter when an end-to-end path in the chain of administrative domains accepts the request, so that the Internet-based application or the Internet-based service is provisioned to the network with the specific network parameter across the end-to-end path; and generate blockchain transactions that append network status updates to the blockchain during the specific time period.

In yet another form, one or more non-transitory computer-readable storage media is provided encoded with software comprising computer executable instructions and when the software is executed operable to: receive a root block for a blockchain, the root block being generated by a network device in a network utilizing an Internet-based application or an Internet-based service provisioned by a chain of administrative domains and the root block including a request for a specific network parameter over a specific time period; append a first block to a blockchain including the root block to accept the request; configure an administrative domain in the chain of administrative domains in accordance with the specific network parameter when an end-to-end path in the chain of administrative domains accepts the request, so that the Internet-based application or the Internet-based service is provisioned to the network with the specific network parameter across the end-to-end path; and generate blockchain transactions that append network status updates to the blockchain during the specific time period.

A number of advantages are achieved via the methods, system, device(s) and computer readable media described herein. As one notable example, the techniques presented herein provide a flexible and dynamic policy management system that allows a chain of administrative domains to quickly alter or shift network parameters of application or service provisioning. In view of this and the quick consensus techniques utilized by the techniques presented herein, a network can essentially request network parameters for an application or service on-demand. This will provide a cost and efficiency savings for the network. Moreover, more generally, the techniques provided herein allow administrative domains in a chain of administrative domains to communicate and coordinate. This allows various network parameters to be guaranteed from end-to-end across the chain of administrative domains. This also allows the administrative domains to provide security enhancements and, for example, provide a first line of defense before traffic to the enterprise network is routed through a DDoS mitigation provider. Instead, malicious traffic from attackers can be blocked near the point of origin.

Generally, the techniques presented herein are applicable to any end-to-end or multi-node policy that would benefit from verification across multiple administrative domains. The blockchain network presented herein provides a distributed, secure, and flexible solution to this issue. In other words, the techniques presented herein solve a problem that is unique to administrative domains.

Although the techniques are illustrated and described herein as embodied in one or more specific examples, the specific details of the examples are not intended to limit the scope of the techniques presented herein, since various modifications and structural changes may be made within the scope and range of the invention. In addition, various features from one of the examples discussed herein may be incorporated into any other examples. Accordingly, the appended claims should be construed broadly and in a manner consistent with the scope of the disclosure.

What is claimed is:

1. A method comprising:
at a first network device associated with an administrative domain that is part of a chain of administrative domains provisioning an Internet-based application or an Internet-based service to a network, receiving a root block for a blockchain, the root block being generated by a second network device in the network and including a request for a specific network parameter over a specific time period;
appending a first block to the blockchain including the root block to accept the request when the first network device makes a determination that the administrative domain can and will satisfy the request, the determination being rendered separately and independently from determinations made by other network devices on behalf of other administrative domains in the chain of administrative domains;

configuring the administrative domain in accordance with the specific network parameter when an end-to-end path in the chain of administrative domains accepts the request from the second network device, so that the Internet-based application or the Internet-based service is provisioned to the network with the specific network parameter across the end-to-end path; and generating blockchain transactions that append network status updates to the blockchain during the specific time period.

2. The method of claim 1, wherein a smart contract is embedded within the root block, and the appending further comprises:

accepting an offer included in the smart contract, wherein code in the smart contract is executed to complete the smart contract when the specific network parameter is determined to be satisfied over the specific time period based on the network status updates.

3. The method of claim 1, further comprising:

validating other blocks and other blockchain transactions published by neighboring administrative domains in the chain of administrative domains.

4. The method of claim 1, wherein the specific network parameter is a bandwidth requirement, and the configuring the administrative domain further comprises:

reconfiguring a bandwidth maximum provided by the administrative domain to satisfy the bandwidth requirement when provisioning the Internet-based application or the Internet-based service to the network.

5. The method of claim 1, wherein the specific network parameter is a filtering rule and the network status updates notify each administrative domain in the chain of administrative domains of at least one of filtering rules being applied by the first network device and attack details known by the administrative domain.

6. The method of claim 5, wherein administrative domains are each associated with a service provider so that the chain is a chain of service providers (a SP chain).

7. The method of claim 1, wherein the network status updates track enforcement of the specific network parameter over the specific time period and the generating further comprises:

appending additional blocks with the blockchain transactions to the blockchain at predetermined or dynamically determined intervals within the specific time period so that the network can monitor compliance with the request across the end-to-end path.

8. A system comprising:

a network including a plurality of first network devices, wherein each of the plurality of first network devices is configured to generate a root block for a blockchain, the root block including a request for a specific network parameter over a specific time period; and a chain of administrative domains provisioning an Internet-based application or an Internet-based service to the network, wherein each of the administrative domains in the chain of administrative domains includes a second network device configured to:

receive the root block;

append a first block to the blockchain including the root block to accept the request when the second network device makes a determination that its administrative domain can and will satisfy the request, the determination being rendered separately and independently from determinations made by other network devices on behalf of other administrative domains in the chain of administrative domains;

configure its associated administrative domain in accordance with the specific network parameter when an end-to-end path in the chain of administrative domains accepts the request from one of the plurality of first network devices, so that the Internet-based application or the Internet-based service is provisioned to the network with the specific network parameter across the end-to-end path; and generate blockchain transactions that append network status updates to the blockchain during the specific time period.

9. The system of claim 8, wherein the system further comprises:

an access network that includes a validating node configured to broadcast the root block to each of the administrative domains in the chain of administrative domains.

10. The system of claim 9, wherein:

the access network utilizes authorization information from a preexisting relationship with the network to validate the root block; and the administrative domains in the chain of administrative domains validate the first block and the blockchain transactions published by neighboring administrative domains.

11. The system of claim 8, wherein a smart contract is embedded within the root block, and each of the second network devices is further configured to:

accept an offer included in the smart contract, wherein code in the smart contract is executed to complete the smart contract when the specific network parameter is determined to be satisfied over the specific time period based on the network status updates.

12. The system of claim 8, wherein the specific network parameter is a bandwidth requirement and, in configuring, each of the second network devices is further configured to:

reconfigure a bandwidth maximum provided by its administrative domain to satisfy the bandwidth requirement when provisioning the Internet-based application or the Internet-based service to the network.

13. The system of claim 8, wherein the specific network parameter is a filtering rule and the network status updates notify each administrative domain in the chain of administrative domains of at least one of filtering rules being applied by one of the second network devices and attack details known by one of the administrative domains.

14. The system of claim 8, wherein the network status updates track enforcement of the specific network parameter over the specific time period and, in generating, each of the second network devices is further configured to:

append additional blocks with the blockchain transactions to the blockchain at predetermined or dynamically determined intervals within the specific time period so that the network can monitor compliance with the request across the end-to-end path.

15. One or more non-transitory computer-readable storage media encoded with software comprising computer executable instructions and when the software is executed operable to:

receive a root block for a blockchain, the root block being generated by a first network device in a network utilizing an Internet-based application or an Internet-based service provisioned by a chain of administrative domains and the root block including a request for a specific network parameter over a specific time period;

append a first block to a blockchain including the root block to accept the request when a second network device executing the instructions makes a determination that an administrative domain in the chain of administrative domains can and will satisfy the request, the determination being rendered separately and independently from determinations made by other network devices on behalf of other administrative domains in the chain of administrative domains;

configure an administrative domain in the chain of administrative domains in accordance with the specific network parameter when an end-to-end path in the chain of administrative domains accepts the request from the first network device, so that the Internet-based application or the Internet-based service is provisioned to the network with the specific network parameter across the end-to-end path; and generate blockchain transactions that append network status updates to the blockchain during the specific time period.

16. The one or more non-transitory computer-readable storage media of claim 15, wherein a smart contract is embedded within the root block, and the executable instructions operable to append further comprise executable instructions operable to:

accept an offer included in the smart contract, wherein code in the smart contract is executed to complete the smart contract when the specific network parameter is determined to be satisfied over the specific time period based on the network status updates.

17. The one or more non-transitory computer-readable storage media of claim 15, further comprising executable instructions operable to:

validate other blocks and other blockchain transactions published by neighboring administrative domains in the chain of administrative domains.

18. The one or more non-transitory computer-readable storage media of claim 15, wherein the specific network parameter is a bandwidth requirement, and the executable instructions operable to configure further comprise executable instructions operable to:

reconfigure a bandwidth maximum provided by the administrative domain to satisfy the bandwidth requirement when provisioning the Internet-based application or the Internet-based service to the network.

19. The one or more non-transitory computer-readable storage media of claim 15, wherein the specific network parameter is a filtering rule and the network status updates notify each administrative domain in the chain of administrative domains of at least one of filtering rules being applied by the administrative domain and attack details known by the administrative domain.

20. The one or more non-transitory computer-readable storage media of claim 15, wherein the network status updates track enforcement of the specific network parameter over the specific time period and the executable instructions operable to generate further comprise executable instructions operable to:

append additional blocks with the blockchain transactions to the blockchain at predetermined or dynamically determined intervals within the specific time period so that the network can monitor compliance with the request across the end-to-end path.

* * * * *